US011647567B2

(12) United States Patent
Song

(10) Patent No.: US 11,647,567 B2
(45) Date of Patent: May 9, 2023

(54) ELECTRIC HEATER

(71) Applicant: LG Electronics Inc., Seoul (KR)

(72) Inventor: Misun Song, Seoul (KR)

(73) Assignee: LG Electronics Inc., Seoul (KR)

( * ) Notice: Subject to any disclaimer, the term of this patent is extended or adjusted under 35 U.S.C. 154(b) by 560 days.

(21) Appl. No.: 16/540,448

(22) Filed: Aug. 14, 2019

(65) Prior Publication Data

US 2020/0068664 A1 Feb. 27, 2020

(30) Foreign Application Priority Data

Aug. 21, 2018 (KR) ........................ 10-2018-0097596

(51) Int. Cl.

*H05B 3/10* (2006.01)
*H05B 3/16* (2006.01)
*H05B 3/26* (2006.01)
*H05B 3/68* (2006.01)
*H05B 3/76* (2006.01)
(Continued)

(52) U.S. Cl.

CPC ............ *H05B 3/76* (2013.01); *A47J 36/2483* (2013.01); *F24C 7/062* (2013.01); *F24C 7/088* (2013.01); *H05B 3/03* (2013.01); *H05B 3/20* (2013.01); *H05B 3/26* (2013.01); *H05B 3/265* (2013.01); *H05B 3/68* (2013.01); *H05B 3/748* (2013.01); *H05B 2203/007* (2013.01);
(Continued)

(58) Field of Classification Search

None
See application file for complete search history.

(56) References Cited

U.S. PATENT DOCUMENTS 3,883,719 A 5/1975 Hurko
4,859,835 A 8/1989 Balderson
(Continued)

FOREIGN PATENT DOCUMENTS

CN 106255243 12/2016
CN 205793427 12/2016
(Continued)

OTHER PUBLICATIONS

CN Office Action in Chinese Appln. No. 201910773351.9, dated Jun. 16, 2021, 20 pages (with English translation).
(Continued)

*Primary Examiner* — Joseph M. Pelham
(74) *Attorney, Agent, or Firm* — Fish & Richardson P.C.

(57) ABSTRACT

An electric heater includes a substrate and an inner plane heating element formed on one surface of the substrate. The inner plane heating element includes an inner pattern portion connecting a start point with an end point. The inner pattern portion includes a first track, a second track located outside the first track and spaced part from the first track, a first bridge connecting the first track with one end of the second track, a third track located outside the second track and spaced apart from the second track, and a second bridge connecting the other end of the second track with the third track. A first gap G1 between the first and second tracks is shorter than a second gap G2 between the second and third tracks along a virtual line crossing the first, second and third tracks and closer to the first bridge than the second bridge.

23 Claims, 8 Drawing Sheets
(3 of 8 Drawing Sheet(s) Filed in Color)

(51) Int. Cl.

| | |
|---|---|
| ***H05B 3/74*** | (2006.01) |
| ***H05B 3/03*** | (2006.01) |
| ***F24C 7/08*** | (2006.01) |
| ***A47J 36/24*** | (2006.01) |
| ***H05B 3/20*** | (2006.01) |
| ***F24C 7/06*** | (2006.01) |

(52) U.S. Cl.
CPC .. *H05B 2203/016* (2013.01); *H05B 2203/017* (2013.01); *H05B 2203/028* (2013.01); *H05B 2203/03* (2013.01)

(56) References Cited

U.S. PATENT DOCUMENTS

| | | | | |
|---|---|---|---|---|
| 4,973,826 | A | 11/1990 | Baudry et al. | |
| 5,177,341 | A * | 1/1993 | Balderson | H05B 3/26 219/543 |
| 6,018,149 | A * | 1/2000 | Higgins | H05B 1/0266 219/443.1 |
| 6,043,467 | A * | 3/2000 | Little | H05B 1/0269 219/542 |
| 2002/0088111 | A1* | 7/2002 | Von Arx | A47J 36/2461 29/611 |
| 2003/0044173 | A1* | 3/2003 | Natsuhara | H05B 3/265 392/479 |
| 2003/0075537 | A1* | 4/2003 | Okajima | H01L 21/67103 219/444.1 |
| 2004/0074893 | A1* | 4/2004 | Wermbter | H05B 3/748 219/465.1 |
| 2005/0199610 | A1* | 9/2005 | Ptasienski | H05K 3/1241 219/539 |
| 2010/0193502 | A1* | 8/2010 | Kim | H05B 3/748 219/482 |
| 2015/0163863 | A1* | 6/2015 | Wegener | H05B 1/0236 219/202 |
| 2017/0086259 | A1 | 3/2017 | Du et al. | |
| 2020/0060468 | A1* | 2/2020 | Song | H05B 3/74 |
| 2020/0060469 | A1* | 2/2020 | Song | H05B 3/748 |
| 2020/0063971 | A1* | 2/2020 | Song | H05B 3/74 |
| 2020/0063972 | A1* | 2/2020 | Song | H05B 3/74 |
| 2020/0063974 | A1* | 2/2020 | Song | F24C 7/067 |
| 2020/0063975 | A1* | 2/2020 | Song | F24C 7/083 |
| 2020/0063976 | A1* | 2/2020 | Song | H05B 3/03 |
| 2020/0063977 | A1* | 2/2020 | Song | H05B 3/03 |
| 2020/0068664 | A1* | 2/2020 | Song | H05B 3/26 |
| 2020/0113378 | A1* | 4/2020 | Song | H05B 3/26 |
| 2020/0120759 | A1* | 4/2020 | Song | H05B 3/748 |
| 2020/0396801 | A1* | 12/2020 | Unno | H05B 3/283 |
| 2021/0243850 | A1* | 8/2021 | Ishikawa | H01L 21/02 |

FOREIGN PATENT DOCUMENTS

| | | |
|---|---|---|
| DE | 19835378 | 2/2000 |
| EP | 0286215 | 10/1988 |
| EP | 0319079 | 6/1989 |
| GB | 2230852 | 10/1990 |
| JP | 2005100695 | 4/2005 |
| JP | 2014053574 | 3/2014 |
| KR | 1020090009600 | 1/2009 |
| KR | 2020170002715 | 7/2017 |
| KR | 101762159 | 8/2017 |

OTHER PUBLICATIONS

Extended European Search Report in European Application No. 19174081.0, dated Dec. 11, 2019, 3 pages.

* cited by examiner

C-C'

D-D'

ELECTRIC HEATER

CROSS-REFERENCE TO RELATED APPLICATIONS

The present application claims priority under 35 U.S.C. 119 and 35 U.S.C. 365 to Korean Patent Application No. 10-2018-0097596, filed on Aug. 21, 2018 which is hereby incorporated by reference in its entirety.

BACKGROUND OF THE INVENTION

1. Field of the Invention

The present invention relates to an electric heater applied to a cooking appliance, and more particularly, to an electric heater having a plane heating element capable of preventing dielectric breakdown from occurring due to a potential difference.

2. Discussion of the Related Art

In general, a cooking appliance refers to a device for heating and cooking food using gas or electricity. Various products such as a microwave oven using microwaves, an oven using a heater, a gas stove using gas, an electric stove using electricity or a cooktop including a gas stove or an electric stove have come into widespread use.

The gas stove directly generates flame using gas as a heating source, while the electric stove heats a container and food placed on a top plate thereof using electricity.

In the gas stove, heat loss caused by flame is large and contaminants are discharged due to incomplete combustion, thereby polluting room air. Therefore, recently, electric stoves are attracting attention.

Electric stoves may be classified into an inductive electric stove which directly heats a container in which a magnetic field is generated by a magnetic induction method, and a resistive electric stove which heats a top surface made of ceramic using a hot wire.

The inductive electric stove has a short cooking time at a high temperature and must use a dedicated magnetic container. The resistive electric stove may use an existing container but has a relatively long cooking time.

Although an existing resistive electric stove uses a heating element made of a nichrome wire, an electric heater using a plane heating element is being developed in order to reduce the thickness of the heating element.

In addition, in order to shorten the cooking time, a resistive electric stove using an electric heater capable of heating a limited area at a high temperature is being developed.

As an example of such an electric heater, Korean Patent Registration No. 10-1762159 B1 (Aug. 4, 2017) discloses a plane heating element including a substrate including a surface made of an electrically insulating material, a heating element attached to the surface of the substrate and having a predetermined shape, and a power supply for supplying electricity to the heating element.

In the electric heater, the temperature distribution of an object to be heated may be changed according to the shape (that is, the pattern) of the plane heating element, and the plane heating element may be formed in a shape capable of heating the object to be heated as uniformly as possible.

The plane heating element of the electric heater includes a plurality of tracks having a straight-line shape or an arc shape and adjacent tracks of the plurality of tracks may be connected through a bridge (or a track).

As another example of the heater, European Patent Publication No. EP 0,228,808A2 (published on Jul. 15, 1987) discloses a temperature sensitive device. Such a device is configured by printing a heater track made of a conductive material and a plurality of electrodes on a ceramic coating layer. As current is supplied through the electrodes, radiant heat is generated in the heater track.

However, a conventional plane heating element includes a heating portion in which one hot wire is formed in a predetermined pattern within a limited area. In order to generate heat at a temperature higher than 500° C., the heating portion is designed to have high resistance.

Accordingly, a large potential difference is generated according to the shape of the pattern or the positions of the electrodes, excessive local heating occurs in a portion in which the potential difference is large and the hot wire is destroyed.

FIGS. 1*a* and 1*b* are views showing an example in which dielectric breakdown occurs in a conventional plane heating element.

When alternating current (AC) is used, a capacitive reactance resistance occurs between hot wires. However, since the dielectric constant of a base material increases in a high-temperature heating environment, capacitive reactance rapidly decreases and local heating and dielectric breakdown occur in a zone in which the potential difference is large.

When a gap between hot wires of the pattern is uniform according to the prior art, dielectric breakdown occurs between outermost bridges of the pattern A as shown in FIG. 1*a* or between the electrodes B as shown in FIG. 1*b*.

In order to configure a high-temperature plane heating element formed in the limited area, there is a need to design a pattern and electrodes capable of solving local heating and dielectric breakdown occurring due to a potential difference.

SUMMARY OF THE INVENTION

An object of the present invention is to provide an electric heater including a plane heating element capable of solving local heating and dielectric breakdown even when a pattern portion is configured within a limited area.

Another object of the present invention is to provide an electric heater including a plane heating element capable of uniformly generating heat by a pattern portion.

Another object of the present invention is to provide an electric heater including a plane heating element capable of preventing dielectric breakdown generated in a portion of an electrode portion and a pattern portion.

To achieve the above objects, there is provided an electric heater including a substrate (an insulating material capable of forming a conductor pattern on a surface of an insulating substrate) and an inner plane heating element formed on one surface of the substrate, wherein the inner plane heating element includes an inner pattern portion connecting a start point with an end point, wherein the inner pattern portion includes a first track, a second track located outside the first track and spaced part from the first track, a first bridge connecting the first track with one end of the second track, a third track located outside the second track and spaced apart from the second track, and a second bridge connecting the other end of the second track with the third track, and wherein a first gap G1 between the first track and the second track is shorter than a second gap G2 between the second track and the third track along a virtual line crossing the first track, the second track and the third track and closer to the first bridge than the second bridge. At this time, each of the first, second and third tracks may have an arc shape and the virtual line may pass through one of arc centers of the first, second and third tracks.

Accordingly, the gap between the tracks of the pattern portion having a smallest potential difference within the limited area is shortest and the gap between the tracks of the pattern portion having a large potential difference is relatively large, thereby solving local heating and dielectric breakdown in the pattern portion.

In the present invention, the inner plane heating element may include a pair of inner electrodes connected to the inner pattern portion, and a third gap G3 between the inner electrodes may be 12 mm or more. That is, the gap between the electrodes having a large potential difference is large, thereby preventing dielectric breakdown of the electrodes.

In the present invention, the inner pattern portion includes a plurality of arc-shaped inner tracks spaced apart from each other and each having a length increasing from an inner side to an outer side and a plurality of inner bridges connecting the inner tracks in series, the inner electrodes may be connected to an outermost side of the inner pattern portion, and the inner tracks, the inner bridges and the inner electrodes may be symmetrical with respect to a reference line passing through a center of the inner pattern portion. That is, the pattern portion for symmetrically generating heat is configured, by uniformly generating heat in the entire zone.

In the present invention, a gap G4 between the inner bridges facing each other with respect to the reference line may be shortest at an innermost side of the inner pattern portion or may be shorter than a gap G3 between the inner electrodes. That is, as the potential difference decreases, the gap between the bridges decreases, thereby designing the bridges in the limited area in consideration of the potential difference.

In the present invention, a gap G4 between the inner bridges facing each other with respect to the reference line may be longer than the first gap G1 and may be 6 mm or more. That is, the gap between the bridges increases, thereby preventing the dielectric breakdown of the bridges and local heating.

In the present invention, a thickness $T_1$ of each of the inner electrodes may be at least 1.5 times greater than a thickness $T_0$ of each of the inner tracks and a thickness $T_2$ of each of the inner bridges may be at least 1.5 times greater than a thickness $T_0$ of each of the inner tracks. That is, the resistance of the electrode or the bridge having a relatively large potential difference decreases, thereby efficiently decreasing a heating temperature.

In the present invention, the electric heater further includes an outer plane heating element located outside the inner plane heating element and formed on one surface of the substrate, and the outer plane heating element may include at least one outer pattern portion located outside the inner pattern portion and connecting a start point with an end point, and a pair of outer electrodes connected to the outer pattern portion. That is, it is possible to configure multiple pattern portions.

In the present invention, the outer electrodes may be horizontally located outside the inner electrodes.

In addition, the outer pattern portion may include a plurality of arc-shaped outer tracks spaced apart from each other and each having a length increasing from an inner side to an outer side and a plurality of outer bridges connecting the outer tracks in series, the outer electrodes may be connected to an innermost side of the outer pattern portion, and the outer tracks, the outer bridges and the outer electrodes may be symmetrical with respect to a reference line passing through a center of the outer pattern portion.

In particular, at least some of the inner/outer electrodes may be located between a pair of outer bridges.

In addition, a thickness $T_3$ of each of the outer electrodes may be at least 1.5 times greater than a thickness $T_0$ of each of the outer tracks, and a thickness $T_4$ of each of the outer bridges may be at least 1.5 times greater than a thickness $T_0$ of each of the outer tracks. That is, the resistance of the electrode or the bridge having a relatively large potential difference decreases, thereby efficiently decreasing a heating temperature.

BRIEF DESCRIPTION OF THE DRAWINGS

The patent or application file contains at least one drawing or photograph executed in color. Copies of this patent or patent application publication with color drawing(s) or photograph(s) will be provided by the Office upon request and payment of the necessary fee.

DETAILED DESCRIPTION OF THE PREFERRED EMBODIMENTS

Hereinafter, the present embodiment will be described in detail with reference to the accompanying drawings. It should be understood, however, that the scope of the inventive concept of the present embodiment may be determined from the matters disclosed in the present embodiment, and the spirit of the present invention possessed by the present embodiment includes implementations such as addition, deletion, modification etc. of components to the proposed embodiment.

Figure 1A:
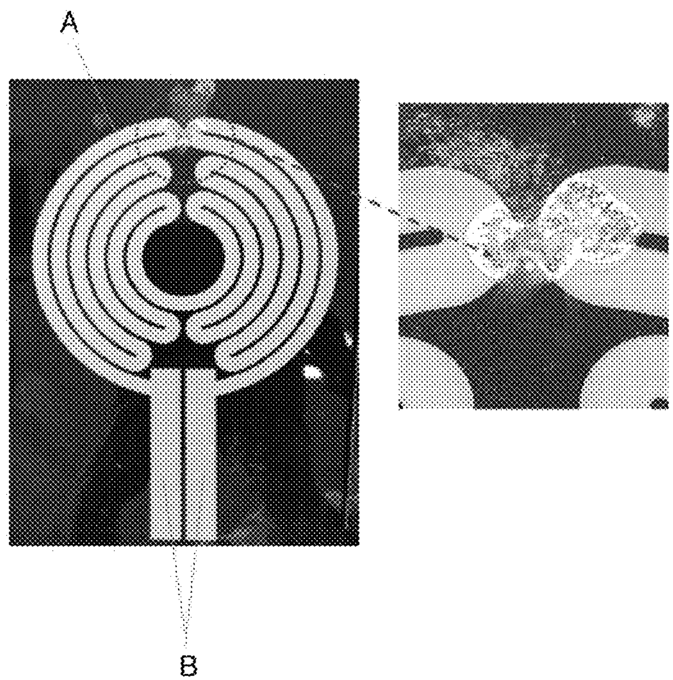
FIGS. 1*a* and 1*b* are views showing an example in which dielectric breakdown occurs in a pattern and an electrode of a conventional plane heating element.
Figure 1B:
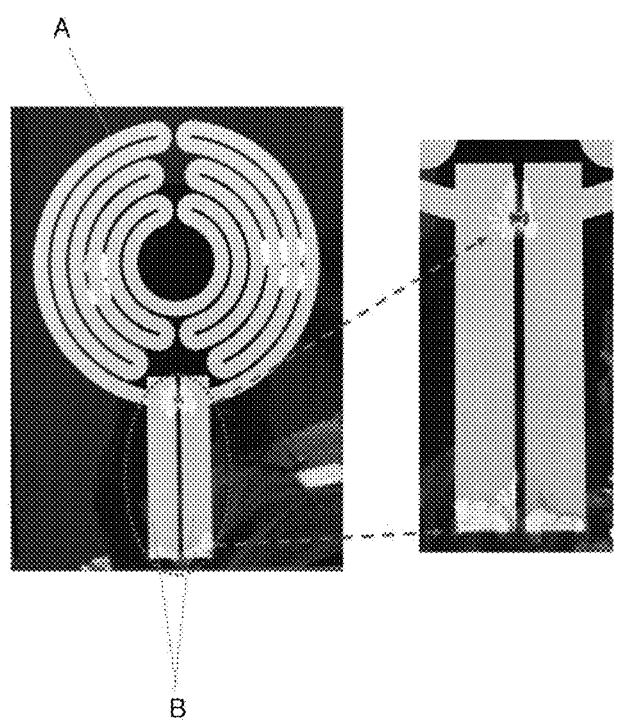
Figure 2:
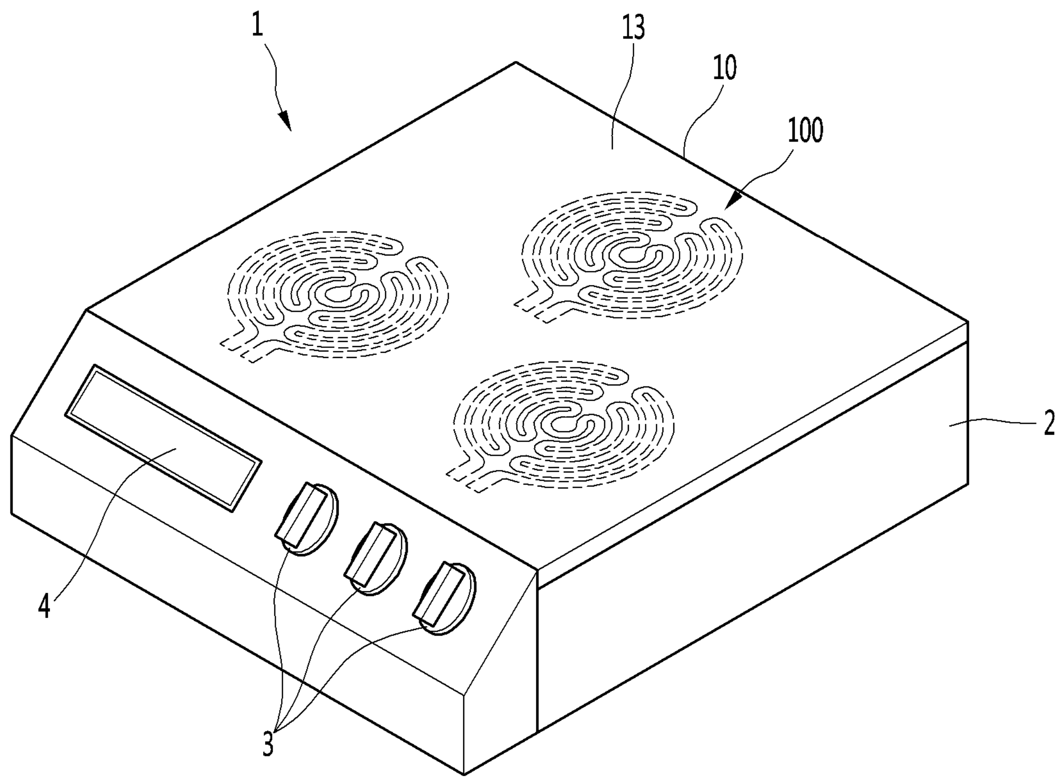
FIG. 2 is a perspective view showing an electric stove, to which an electric heater according to an embodiment of the present invention is applied.
Figure 3:
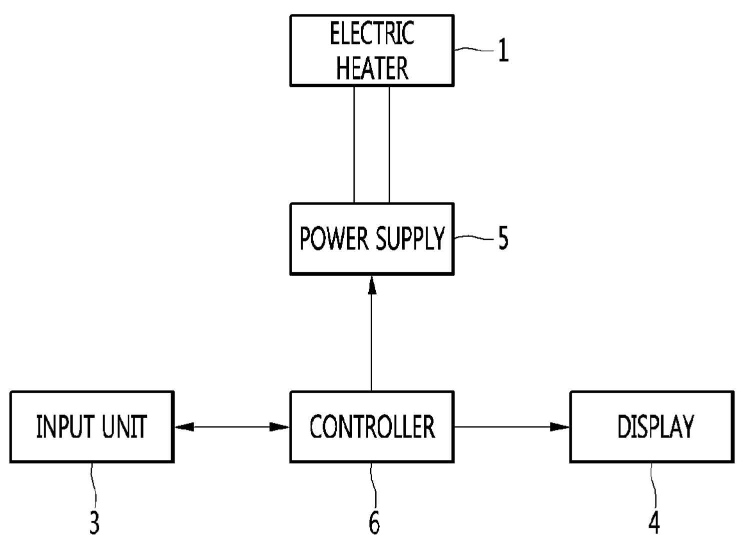
FIG. 3 is a control block diagram of an electric stove, to which an electric heater according to an embodiment of the present invention is applied.

FIG. 2 is a perspective view showing an electric stove, to which an electric heater according to an embodiment of the present invention is applied, and FIG. 3 is a control block diagram of an electric stove, to which an electric heater according to an embodiment of the present invention is applied.

The electric heater 1 of the present invention may configure a portion of an electric stove such as a cooktop.

The electric stove may include a cabinet 2 forming appearance. The electric heater 1 may be provided on the cabinet 2. The upper surface of the cabinet 2 may be opened and the electric heater 1 may be provided on the upper surface of the cabinet 2.

The electric stove may include an input unit 3 for manipulating the electric stove and a display 4 for displaying a variety of information such as information on the electric stove. In addition, the electric stove may further include a power supply 5 connected to the electric heater 1 to apply current to the electric heater 1. The electric stove may further include a controller 6 for controlling the power supply 5 and the display 4 according to input of the input unit 3.

The electric heater 1 may be provided on the cabinet 2 such that the upper surface thereof is exposed to the outside. An object to be heated by the electric stove may be placed on the upper surface of the electric heater 1, and the upper surface of the electric heater 1 may be a surface in which the object to be heated is seated.

Figure 4:
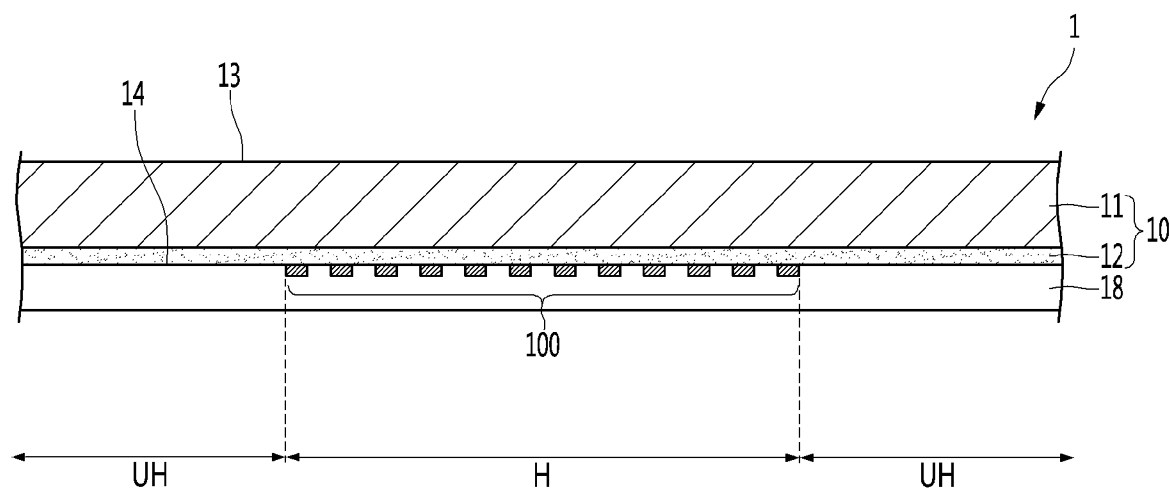
FIG. 4 is a cross-sectional view showing an electric heater according to an embodiment of the present invention.
Figure 5:
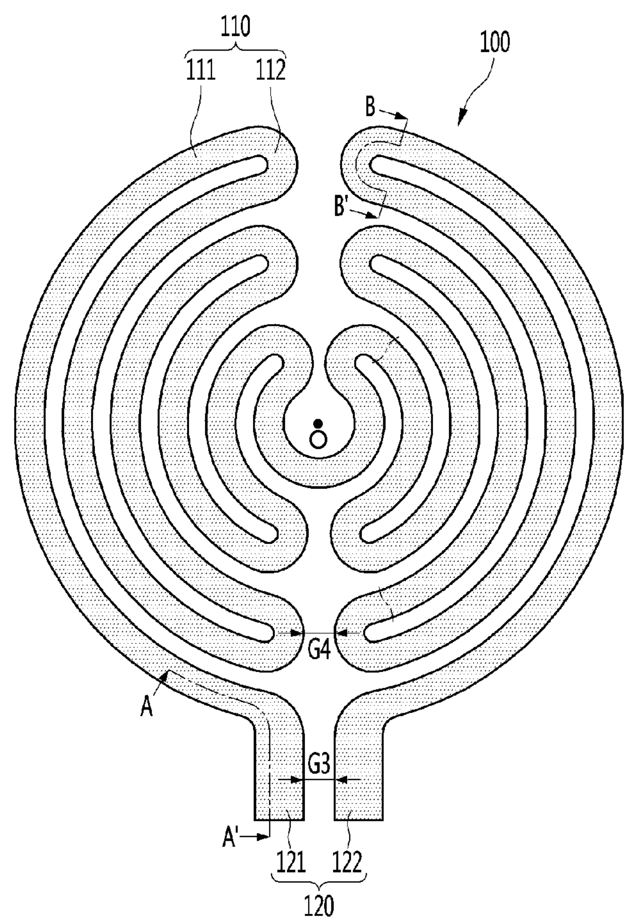
FIG. 5 is a plan view showing a single pattern type plane heating element according to an embodiment of the present invention.

FIG. 4 is a cross-sectional view showing an electric heater according to an embodiment of the present invention.

The electric heater 1 may include a substrate 10 and a plurality of plane heating element 100 formed on one surface of the substrate 10.

The substrate 10 may be an insulating substrate having a conductor pattern formed on a surface thereof. The upper surface of the substrate 10 may be a surface 13 in which the object to be heated is seated. The lower surface of the substrate 10 may be a surface 14 in which the plane heating element 100 are formed.

The substrate 10 may include only a base 11 formed of an insulating material or may include a base 11 formed of an insulating material or a non-insulating material and an insulating layer 12 formed on one surface of the base 11.

The base 11 may be glass and the insulating layer 12 may be formed on the lower surface of the glass using a coating or a printing method.

The plane heating element 100 may be directly formed on one surface of the base 11 formed of an insulating material or may be formed on the insulating layer 12.

The base 11 may be formed in a shape of a plate on which the object to be heated is placed or in a shape of a container in which the object to be heated is received.

The insulating layer 12 may be formed on the lower surface of the base 11. The insulating layer 12 may be formed on the entire lower surface of the base 11 or may be formed on a portion of the lower surface of the base 11. The insulating layer 12 may be formed only in a zone in which the plane heating element 100 will be formed. The insulating layer 12 may configure the entire lower surface of the substrate 10 or a portion of the lower surface of the substrate 10.

The plane heating element 100 may be formed on the lower surface 14 of the insulating layer 12. The plane heating element 100 may have a size smaller than the substrate 10 and the lower surface of the substrate 10 may have a heated zone H, in which the plane heating element 100 is formed, and an unheated zone UH located around the heated zone H.

The heater 1 may further include a coating layer 18 surrounding the plane heating element 100. The coating layer 18 may be formed of an electrically insulating material to protect the plane heating element 100.

The substrate 10 of the present embodiment may be formed of a flexible material, such as a flexible insulating film. In this case, the electric heater 1 may be a flexible planar heater. Such a flexible planar heater may be attached to a member, on which the object to be heated is placed, to heat the object to be heated, like the upper plate of the electric stove.

FIGS. 5 to 8 are views showing a single pattern type plane heating element according to an embodiment of the present invention.

The single pattern type plane heating element according to the present invention may include only a first plane heating element 100 composed of one film-type heater track as shown in FIGS. 5 to 8, and include a pattern portion 110, in which the film-type heater track is arranged in a predetermined shape, and an electrode portion 120 for supplying current to the pattern portion 110.

The pattern portion 110 includes a heating portion closely arranged in a limited circular area. The pattern portion is configured such that a start point and an end point located at outermost sides are connected along various paths, and is bilaterally symmetrical with respect to the center O of the pattern portion 110 shown in FIG. 5.

According to the embodiment, the pattern portion 110 may include a plurality of arc-shaped tracks 111 spaced apart from each other and having a length increasing from the center to an outer side and a plurality of bridges 112 connecting the tracks 111 in series.

At this time, the area of the pattern portion 110 and the length of the film-type heater track configuring the pattern portion 110 may be set to be proportional to required power.

The electrodes 120 are composed of a non-heating portion having a relatively lower heat value than the pattern portion 110 and include a positive electrode 121 for receiving current and a negative electrode 122 for outputting current. The positive electrode 121 and the negative electrode 122 may be horizontally located at a predetermined gap.

The positive electrode 121 is a portion extending from the start point of the pattern portion 110 and connected to an external input terminal, and the negative electrode 122 is a portion extending from the end point of the pattern portion 110 and connected to an external output terminal.

When current is supplied to the single pattern type plane heating element, the pattern portion 110 acts as a resistor and heat is generated in a bilaterally symmetrical form.

While current flows, a voltage is gradually decreased from the start point to the end point of the pattern portion 110 according to position, and a potential difference occurs between the tracks 111 and the bridges 112 located closely.

A large potential difference is generated between the positive electrode 121 and the negative electrode 122. In order to maintain an insulation gap, a third gap G3 between the positive electrode 121 and the negative electrode 122 may be longest.

According to the embodiment, the third gap G3 may be 12 mm or more, in order to prevent dielectric breakdown between the positive electrode 121 and the negative electrode 122.

The start point and the end point of the pattern portion 110 are located at the outermost side of the pattern portion 110, and the tracks 111 and the bridges 112 may be formed to be bilaterally symmetrical with respect to the center of the pattern portion 110.

When current flows along the pattern portion 110, the voltage is decreased from the outside to the inside of the left bridges 112 and the voltage is decreased from the inside to the outside of the right bridges 112. That is, a smallest potential difference is generated between the bridges 112 located at the innermost side of the pattern portion 110, and a smallest insulation gap may be formed.

Accordingly, a fourth gap G4 between the bridges 112 facing each other with respect to the reference line may be shortest.

At this time, in order to prevent dielectric breakdown of the bridges 112, the fourth gap G4 may be 6 mm or more to secure an insulation gap.

Figure 6:
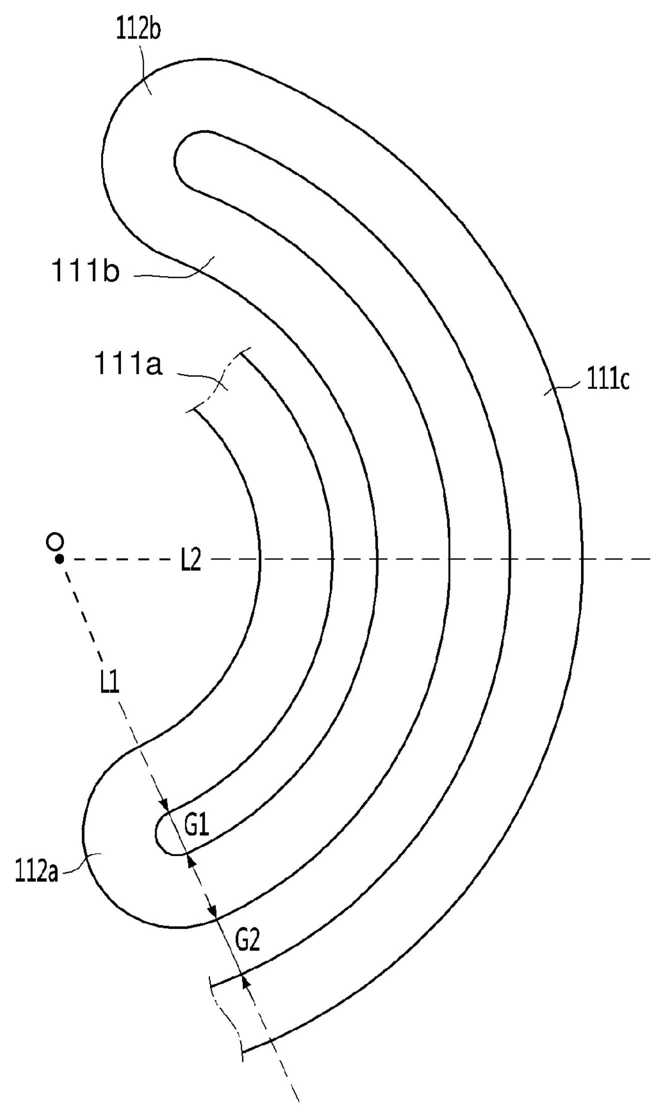
FIG. 6 is a view showing a portion of a pattern portion applied to FIG. 5.
Figure 7:
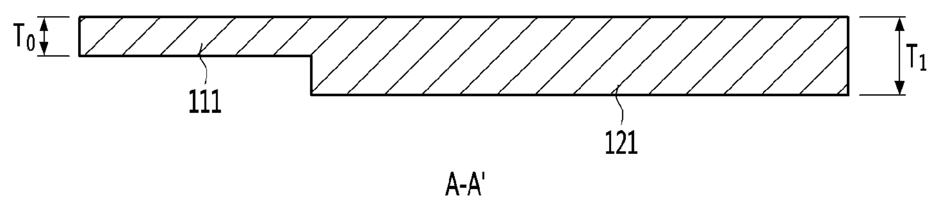
FIGS. 7 to 8 are cross-sectional views taken along lines A-A' and B-B' of FIG. 5.

In a portion of the pattern portion 110, as shown in FIG. 6, a second track 111*b* is located outside a first track 111*a*, a third track 111*c* is located outside the second track 111*b*, a first bridge 112*a* connecting the first track 111*a* with one end of the second track 111*b* is located, and a second bridge 112*b* connecting the other end of the second track 111*b* with the third track 111*c* is located.

When current is supplied, current flows along the first track 111*a*, the first bridge 112*a*, the second track 111*b*, the second bridge 112*b* and the third track 111*c*, and the voltage is decreased in a direction in which current flows.

At this time, the potential difference between the first track 111*a* and the second track 111*b* increases as a distance from the first bridge 1112*a* increases and the potential difference between the second track 111*b* and the third track 111*c* increases as a distance from the second bridge 112*b* increases.

Accordingly, if it is assumed that a virtual line L1 crossing the first track 111*a*, the second track 111*b* and the third track 111*c* and is closer to the first bridge 112*a* than the second bridge 112*b* is located, a first gap G1 between the first track 111*a* and the second track 111*b* located on the virtual line L1 is shorter than a second gap G2 between the second track 111*b* and the third track 111*c* (G1<G2).

That is, in a zone closer to the first bridge 112*a* than the second bridge 112*b* with respect to the center line L2 crossing the center O of the first track 111*a*, the second track 111*b* and the third track 111*c*, the first gap G1 is shorter than the second gap G2.

Of course, the first track 111*a*, the second track 111*b* and the third track 111*c* are spaced apart from one another in an arc shape and the centers of the arcs forming the first track 111*a*, the second track 111*b* and the third track 111*c* may not match.

However, the virtual line may be defined to pass through the center of the arc of at least one of the first track 111*a*, the second track 111*b* and the third track 111*c* and to cross the first track 111*a*, the second track 111*b* and the third track 111*c*.

In order to reduce the potential difference, in a portion connected to the bridge, the first gap G1 between the tracks is shortest, the third gap G3 between the electrodes is longest, and the fourth gap G4 between the bridges facing each other with respect to the reference line is longer than the first gap G1 and is shorter than the third gap G3 (G1<G4<G3).

In addition, in order to prevent dielectric breakdown in a high-temperature environment, the third gap G3 between the electrodes may be 12 mm or more and the fourth gap G4 between the bridges may be 6 mm or more, thereby securing an insulation gap.

However, in order to form the pattern portion and the electrodes within the limited area, the third gap G3 or the fourth gap G4 may be limited.

Accordingly, if resistance of the electrodes or bridges having a relatively large potential difference is somewhat lowered, it is possible to reduce a heating temperature at that point and to prevent dielectric breakdown.

Figure 8:
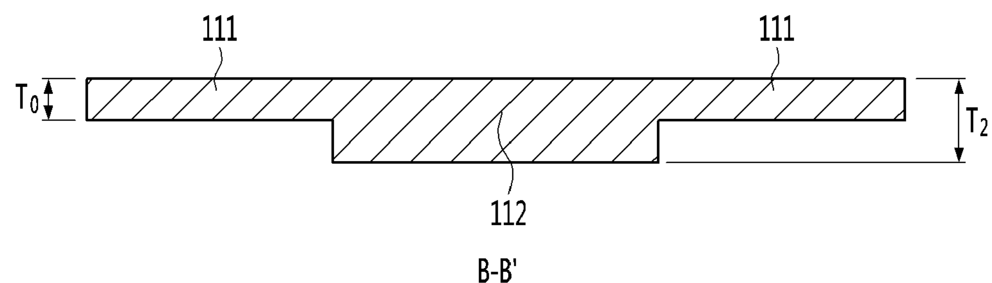

According to the embodiment, as shown in FIG. 8, the thickness $T_1$ of the positive electrode 121 may be at least 1.5 times greater than the thickness $T_0$ of the track 111 on the pattern portion side and, as shown in FIG. 6, the thickness $T_2$ of the bridge 112 on the pattern portion side may be at least 1.5 times greater than the thickness $T_0$ of the track 111 on the pattern portion side.

That is, the pattern portion 110 and the electrode portion 120 are printed with the same thickness $T_0$, and then over-coating may be performed at the positions of the electrode portion 120 and the bridge 112 with predetermined thickness $T_1$-$T_0$ and $T_2$-$T_0$ or printing may be performed at least twice, without being limited thereto.

Figure 9:
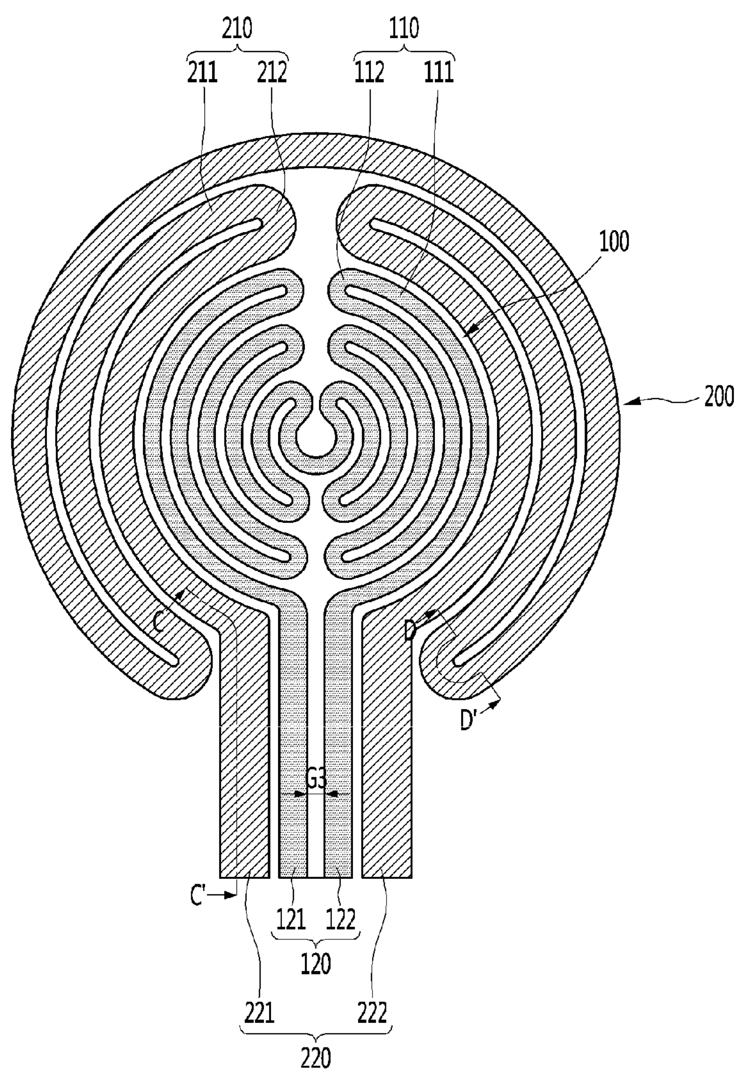
FIG. 9 is a plan view showing a single pattern type plan heating element according to an embodiment of the present invention.
Figure 10:
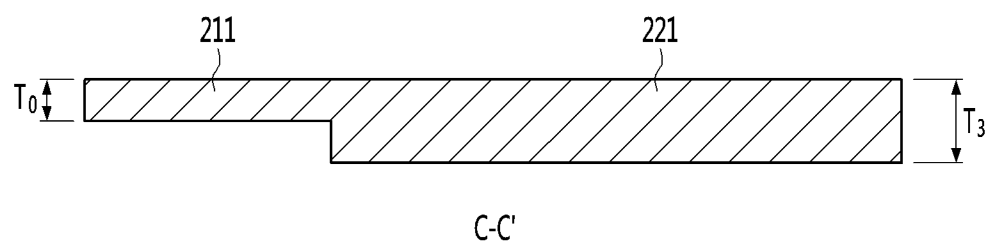
FIGS. 10 to 11 are cross-sectional views taken along lines C-C' and D-D' of FIG. 9.
Figure 11:
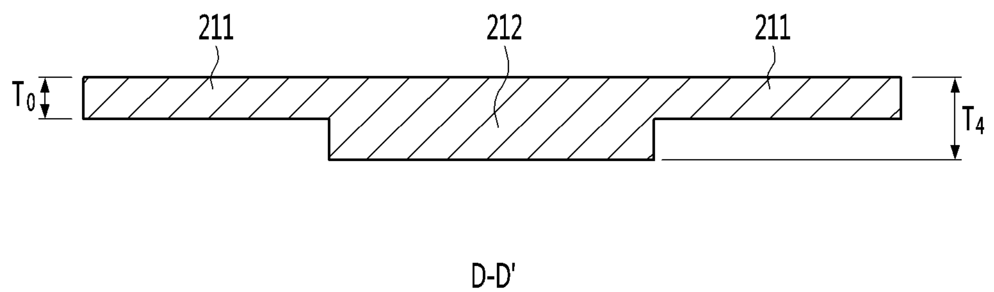

FIGS. 9 to 11 are views showing a single pattern type plan heating element according to an embodiment of the present invention.

The single pattern type plane heating element according to the present invention includes an inner plane heating element 100 located at the center of the same plane and an outer plane heating element 200 located to surround the inner plane heating element 100, as shown in FIGS. 9 to 11.

The inner plane heating element 100 includes an inner pattern portion 110 arranged in a predetermined shape and an inner electrode portion 120 connected to the inner pattern portion 110, and has the same configuration as the above-described single pattern type plane heating element. Therefore, a detailed description thereof will be omitted.

The outer plane heating element 200 includes an outer pattern portion 210 located outside the inner pattern portion 110 and arranged in a predetermined shape, and an outer electrode portion 220 connected to the outer pattern portion 210.

The outer pattern portion 210 includes a heating portion closely arranged in a limited area having a ring shape and surrounding the outside of the inner pattern portion 110. The outer pattern portion is configured such that a start point and an end point located at innermost sides are connected along various paths, and is bilaterally symmetrical.

According to the embodiment, the outer pattern portion 210 may include a plurality of outer tracks 211 and a plurality of outer bridges 212, similarly to the inner pattern portion 110.

In addition, a portion of the inner electrode portion 120 and a portion of the outer electrode portion 220, which will be described blow, may be located between the outer bridges 212.

Accordingly, at least the inner and outer electrode portions 120 and 220 having a relatively lower heating temperature than the inner and outer pattern portions 110 and 210 are included between the outer bridges 220, thereby increasing a hot zone in which heat is generated at 500° C. or more and decreasing a dead zone in which heat is generated at a temperature less than the hot zone by 300° C. or less in the heated zone.

Of course, the inner and outer pattern portions 110 and 210 may be designed to distribute required power and the areas of the pattern portions 110 and 210 and the lengths of the film-type heater tracks configuring the pattern portions 110 and 210 may be set to be proportional to distributed power.

The outer electrode 220 also includes a non-heating portion having a lower heat value than the outer pattern portion 210, includes an outer positive electrode 221 and an outer negative electrode 222 similarly to the inner electrode portion 120, and is horizontally located outside the inner electrode portion 120.

Similarly, the outer positive electrode 221 is a portion extending from the start point of the outer pattern portion 210 and is connected to an external input terminal, and the outer negative electrode 222 is a portion extending from the end point of the outer pattern portion 210 and is connected to an external output terminal.

At this time, an insulation gap between the positive electrodes 121 and 221 should be maintained and the negative electrodes 122 and 222 may be connected to each other to be grounded.

According to the embodiment, as shown in FIG. 10, the thickness $T_3$ of the outer positive electrode 221 may be at least 1.5 times greater than the thickness $T_0$ of the outer track 211 on the outer pattern portion side and, as shown in FIG. 11, the thickness $T_4$ of the outer bridge 212 on the outer pattern portion side may be at least 1.5 times greater than the thickness $T_0$ of the outer track 211 on the outer pattern portion side.

That is, the outer pattern portion 210 and the outer electrode portion 220 are coated with the same thickness $T_0$, and then over-coating may be performed at the positions of the outer electrode 220 and the outer bridge 212 with predetermined thickness $T_3$-$T_0$ and $T_4$-$T_0$ or printing may be performed at least twice, without being limited thereto.

When current is supplied to the dual pattern type plane heating element, the inner pattern portion 110 and the outer pattern portion 210 act as a resistor and heat is generated in a bilaterally symmetrical form.

The inner pattern portion 110 and the inner electrode portion 120 are configured such that a gap therebetween is short at a point having a low potential difference and is long at a point having a high potential difference, thereby preventing local heating and dielectric breakdown in a high-temperature environment even if the potential difference is high.

In addition, the inner and outer electrode portions 120 and 220 and the inner and outer bridges 112 and 212 have relatively larger thicknesses than the inner and outer tracks 111 and 211, thereby decreasing resistance, decreasing a heating temperature at that time, and efficiently preventing dielectric breakdown.

Figure 12A:
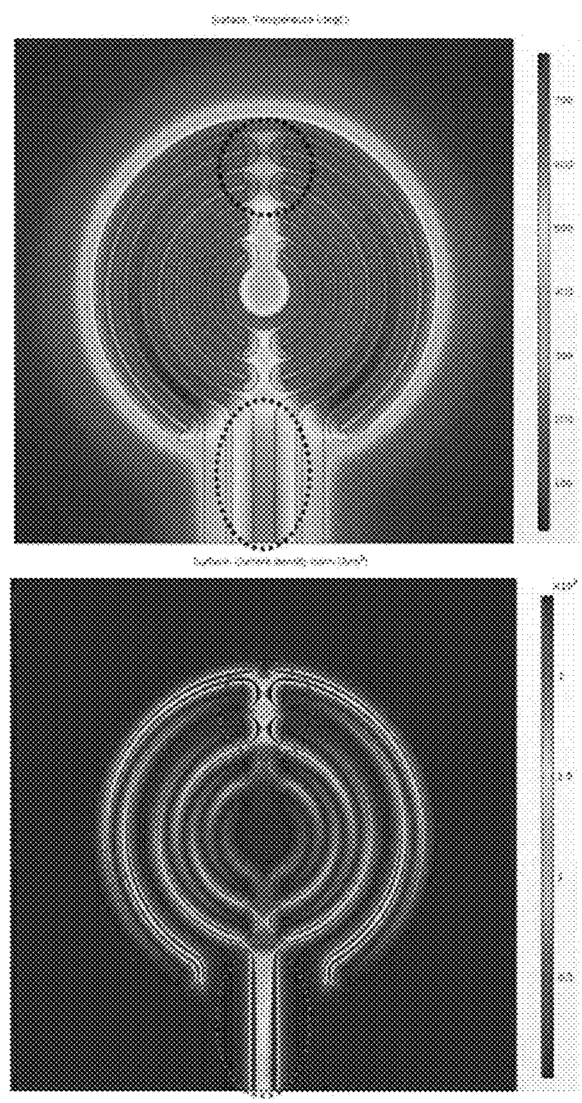
FIGS. 12*a* and 12*b* are views showing heating states before/after the electrode and bridge of a plane heating element is over-coated according to the present invention.
Figure 12B:
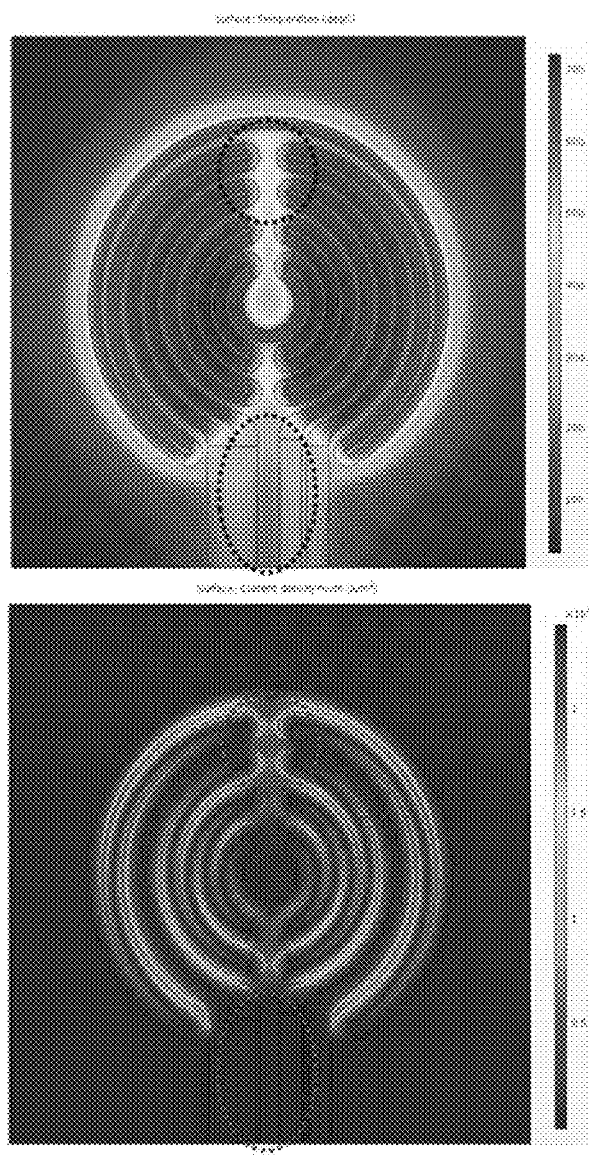

FIGS. 12*a* and 12*b* are views showing heating states before/after the electrode and bridge of a plane heating element is over-coated according to the present invention.

According to the present invention, as shown in FIG. 12*a*, if the gaps between the electrodes and the gaps between the bridges are increased as compared to the prior art, dielectric breakdown between the electrodes and the bridges is solved. However, if the electrodes and the bridges are not relatively thick, relative local heating is maintained.

Accordingly, as shown in FIG. 12*b*, if the gaps between the electrodes and the gaps between the bridges are increased as compared to the prior art and the electrodes and the bridges are relatively thick, it is possible to simultaneously solve dielectric breakdown between the electrodes and the bridges and relative local heating and to heat the entire zone with the uniform temperature.

According to the electric heater of the present invention, the gap between film-type heater tracks having a smallest potential difference in the pattern portion may be shortest and a gap between film-type heater tracks having a large potential difference in the pattern portion may be relatively large.

Accordingly, even if the pattern portion is configured in a limited area in a high-temperature environment, it is possible to solve local heating in the pattern portion through a space, to prevent dielectric breakdown from occurring by local heating in the pattern portion, to uniformly generate heat over the entire area in which the pattern portion is formed, and to secure a maximum heating area within the limited area in which the pattern portion may be formed.

In addition, the gap between the electrodes having a largest potential difference is 12 mm or more or the gap between the innermost bridges having a smallest potential difference in the pattern portion is 6 mm or more, thereby preventing dielectric breakdown of the electrodes and the bridges.

In addition, the electrodes or the bridges of the pattern portion are thicker than the tracks of the pattern portion, thereby efficiently decreasing the heating temperature of the electrode and the bridges which may excessively generate heat.

What is claimed is:

1. An electric heater comprising:

a substrate; and an inner plane heating element that is located at a surface of the substrate and defines a part of a circular area having a center, the inner plane heating element comprising an inner pattern portion that is connected to a pair of inner electrodes and that comprises a plurality of arc-shaped tracks arranged about the center and spaced apart from one another in a radial direction passing through the center, wherein the plurality of arc-shaped tracks comprise:

a first track, a second track spaced apart from the first track in the radial direction away from the center, a first bridge that connects the first track to a first end of the second track, a third track spaced apart from the second track in the radial direction away from the center, and a second bridge that connects a second end of the second track to the third track, wherein the inner pattern portion defines:

a first gap between the first track and the second track, and a second gap between the second track and the third track, the second gap being wider than the first gap along a virtual line that crosses the first track, the second track, and the third track and that extends to a portion of the inner pattern portion closer to the first bridge than to the second bridge, and wherein the virtual line passes through the center.

2. The electric heater of claim 1, wherein the pair of inner electrodes are spaced apart from each other by a third gap that is at least 12 mm.

3. The electric heater of claim 2, wherein the inner pattern portion comprises:

a plurality of inner tracks that define arc shapes about the center and are spaced apart from one another in the radial direction, the plurality of inner tracks being arranged at an inner side and an outer side farther from the center than the inner side in the radial direction, wherein a length of one of the plurality of inner tracks arranged at the outer side greater than a length of another of the plurality of inner tracks arranged at the inner side; and a plurality of inner bridges that connect the plurality of inner tracks in series, wherein the pair of inner electrodes are connected to outermost inner tracks that are located at farthest positions from the center among the plurality of inner tracks in the radial direction away from the center, and wherein each of the inner plurality of tracks, the plurality of inner bridges, and the pair of inner electrodes is symmetrical with respect to a reference line that passes through the center.

4. The electric heater of claim 3, wherein the inner pattern portion further defines a plurality of fourth gaps between any two bridges among the plurality of inner bridges that face each other with respect to the reference line, and wherein the plurality of fourth gaps decrease toward the center along the reference line.

5. The electric heater of claim 3, wherein the inner pattern portion further defines a fourth gap between any two bridges among the plurality of inner bridges that face each other with respect to the reference line, the fourth gap being narrower than the third gap between the pair of inner electrodes.

6. The electric heater of claim 3, wherein the inner pattern portion further defines a fourth gap between any two bridges among the plurality of inner bridges that face each other with respect to the reference line, the fourth gap being narrower than the first gap.

7. The electric heater of claim 3, wherein the inner pattern portion further defines a fourth gap between any two bridges among the plurality of inner bridges that face each other with respect to the reference line, the fourth gap being wider than or equal to 6 mm.

8. The electric heater of claim 3, wherein a thickness of each of the pair of inner electrodes is at least 1.5 times greater than a thickness of each of the plurality of inner tracks in a direction perpendicular to the substrate.

9. The electric heater of claim 3, wherein a thickness of each of the plurality of inner bridges is at least 1.5 times greater than a thickness of each of the plurality of inner tracks in a direction perpendicular to the substrate.

10. The electric heater of claim 2, further comprising an outer plane heating element that is located at the surface of the substrate and that is spaced apart from the inner plane heating element in the radial direction away from the center, wherein the outer plane heating element comprises:

at least one outer pattern portion that is spaced apart from the inner pattern portion in the radial direction away from the center; and a pair of outer electrodes connected to the outer pattern portion.

11. The electric heater of claim 10, wherein the pair of inner electrodes are located between the pair of outer electrodes.

12. The electric heater of claim 10, wherein the outer pattern portion comprises:

a plurality of outer tracks that define arc shapes about the center and are spaced apart from one another in the radial direction, the plurality of outer tracks being arranged at an inner side and an outer side farther from the center than the inner side in the radial direction, wherein a length of one of the plurality of outer tracks arranged at the outer side is greater than a length of another of the plurality of outer tracks arranged at the inner side; and a plurality of outer bridges that connect the plurality of outer tracks in series, wherein the pair of outer electrodes are connected to innermost outer tracks that are located at closest positions to the center among the plurality of outer tracks, and wherein each of the plurality of outer tracks, the plurality of outer bridges, and the pair of outer electrodes is symmetrical with respect to a reference line that passes through the center.

13. The electric heater of claim 12, wherein at least some of the pair of inner electrodes or the pair of outer electrodes is located between a pair of outer bridges among the plurality of outer bridges.

14. The electric heater of claim 12, wherein a thickness of each of the pair of outer electrodes is at least 1.5 times greater than a thickness of each of the plurality of outer tracks in a direction perpendicular to the substrate.

15. The electric heater of claim 12, wherein a thickness of each of the plurality of outer bridges is at least 1.5 times greater than a thickness of each of the plurality of outer tracks in a direction perpendicular to the substrate.

16. An electric heater comprising:

a substrate; and a plane heating element that is located at a surface of the substrate and defines a part of a circular area having a center, wherein the plane heating element comprises:

a pattern portion that comprises a first track and a second track that define arc shapes about the center and that are spaced apart from each other in a radial direction passing through the center, wherein a length of one of the first track or the second track positioned farther from the center is greater than a length of the other of the first track and the second track positioned closer to the center, and a plurality of bridges that connect the first and second tracks in series, the plurality of bridges comprising a first bridge that connects the first track to one end of the second track in series, and wherein a first gap is defined between the first track and the second track along a virtual straight line passing through the center, the first track, and the second track, the first gap decreasing toward the first bridge.

17. The electric heater of claim 16, wherein the plane heating element further comprises a pair of electrodes connected to the pattern portion and spaced apart from each other by an electrode gap that is at least 12 mm.

18. The electric heater of claim 17, wherein the pattern portion comprises:

a plurality of tracks that define the arc shapes about the center, and are spaced apart from one another in the radial direction, the plurality of tracks being arranged at an inner side and an outer side farther from the center than the inner side in the radial direction, wherein a length of one of the plurality of tracks arranged at the outer side greater than a length of another of the plurality of tracks arranged at the inner side, wherein the pair of electrodes are connected to outermost tracks that are disposed at farthest positions from the center among the plurality of tracks, and wherein each of the plurality of tracks, the plurality of bridges, and the pair of electrodes is symmetrical with respect to a reference line that passes through the center.

19. The electric heater of claim 18, wherein the pattern portion defines gaps between any two bridges among the plurality of bridges that face each other with respect to the reference line, and wherein a minimum of the gaps is defined between innermost tracks that are disposed at closest portions to the center among the plurality of tracks.

20. The electric heater of claim 18, wherein the pattern portion defines a gap between any two bridges among the plurality of bridges that face each other with respect to the reference line, the gap being narrower than the electrode gap.

21. The electric heater of claim 18, wherein the pattern portion defines a gap between any two bridges among the plurality of bridges that face each other with respect to the reference line, the gap being wider than the first gap.

22. The electric heater of claim 18, wherein the pattern portion defines a gap between any two bridges among the plurality of bridges that face each other with respect to the reference line, the gap being at least 6 mm.

23. The electric heater of claim 16, wherein the first bridge is curved in a round shape and defines a round corner between the first track and the second track, the round corner being concave toward the first bridge such that the first gap gradually decreases toward the first bridge.

* * * * *